United States Patent [19]

Kitamura et al.

[11] 4,042,648

[45] Aug. 16, 1977

[54] OLEFIN-ACRYLIC ESTER COPOLYMER-THERMOPLASTIC RESIN COMPOSITION

[75] Inventors: Shuji Kitamura, Toyonaka; Takashi Kato, Amagasaki; Masaaki Hirooka, Ibaragi, all of Japan

[73] Assignee: Sumitomo Chemical Company, Limited, Osaka, Japan

[21] Appl. No.: 357,181

[22] Filed: May 4, 1973

[30] Foreign Application Priority Data

May 10, 1972 Japan ................................ 47-46675

[51] Int. Cl.$^2$ ............................................. C08L 23/14
[52] U.S. Cl. ................................ 260/896; 260/897 B; 260/897 C
[58] Field of Search ................................ 260/896, 897

[56] References Cited

U.S. PATENT DOCUMENTS

| 2,775,572 | 12/1956 | Fisk | 260/896 |
|---|---|---|---|
| 3,218,373 | 11/1965 | Salyer | 260/878 |
| 3,440,188 | 4/1969 | Burdick et al. | 260/8 |
| 3,833,689 | 9/1974 | Usamoto et al. | 260/897 B |

FOREIGN PATENT DOCUMENTS

| 837,184 | 3/1970 | Canada | |
|---|---|---|---|
| 846,255 | 7/1970 | Canada | |
| 1,089,279 | 11/1967 | United Kingdom | |
| 901,386 | 7/1962 | United Kingdom | |
| 995,802 | 6/1965 | United Kingdom | 260/897 R |
| 924,457 | 4/1963 | United Kingdom | 260/897 |

Primary Examiner—Carman J. Seccuro
Attorney, Agent, or Firm—Stevens, Davis, Miller & Mosher

[57] ABSTRACT

An olefin-acrylic ester copolymer-thermoplastic resin composition comprising one part by weight of an olefin-acrylic ester copolymer and 0.01 to 100 parts by weight of at least one thermoplastic resin having a modulus of elasticity of $10^3$ to $10^5$ kg/cm$^2$ at room temperature and selected from the group consisting of crystalline thermoplastic resins and non-crystalline thermoplastic resins having a second-order transition point of 10° C. or higher. The said composition is excellent in impact resistance, resistance to water, and alkali resistance and has improved surface characteristics as well as improved low temperature characteristics.

21 Claims, No Drawings

OLEFIN-ACRYLIC ESTER COPOLYMER-THERMOPLASTIC RESIN COMPOSITION

This invention relates to a composition comprising an olefin-acrylic ester copolymer and a thermoplastic resin.

The present inventors have already succeeded in effectively copolymerizing an olefin and an acrylic ester, particularly in obtaining for the first time an alternating copolymer thereof. These novel copolymers have been disclosed in British Patent Nos. 1,089,279; 1,123,722; 1,123,723; and 1,123,724. They further succeeded also in obtaining multi-component copolymers with a variety of functions by copolymerizing an olefin with an acrylic ester in the presence of other monomers (British Patent No. 1,187,105). It has become possible to obtain a sulfur-curable rubber by introducing an unsaturated radical into an olefin-acrylic acid copolymer (French Patent No. 71,07270), and also an amine-curable rubber by copolymerizing an olefin with an acrylic ester in the presence of a halogen-containing ethylenically unsaturated compound as a third component (French Patent No. 71,07271). Although the properties of those copolymers have been little known because they are synthesized for the first time by the present inventors, the same inventors already found that those copolymers are well compatible with various rubbers to provide useful compositions (see, for example, DOS No. 2,018,337).

The present inventors further conducted a series of studies and as a result have now found that such olefin-acrylic ester copolymers are dispersible in a variety of thermoplastic resins to give useful compositions. Since it has heretofore been known that, in general, different high polymers are not sufficiently compatible with one another on mixing for yielding a homogeneous composition except for special and limited combinations which can give useful blends, it was indeed an unexpected result that the olefin-acrylic ester copolymers are compatible with a wide range of thermoplastic resins to form various useful compositions. The reason for such desirable dispersibility in a wide range of different resins seems to be that the olefin-acrylic ester copolymer is bestowed with both of the properties of a non-polar olefin and those of a polar ester group.

It is to be added in this connection that an isobutylene-acrylic ester alternating copolymer has a solubility parameter of 8.1 to 8.6 which is markedly lower than that of an acrylic ester homopolymer and rather approximates that of a hydrocarbon-based polymer, nevertheless the ester group in the olefin-acrylic ester copolymer manifests properties characteristic of a polar compound to full extent.

An object of this invention is to provide a thermoplastic resin composition excellent in impact resistance. The olefin-acrylic ester copolymers for use in this invention are generally amorphous elastomers. By dispersing the said copolymer in a thermoplastic resin, it is possible to improve impact resistance of the latter. A particularly important point is that such an impact resistant resin composition according to this invention has a most favorable weatherability. Most part of the conventional impact resistant thermoplastic resin compositions have been obtained by dispersing a butadiene rubber in thermoplastic resins. Examples include ABS resins, high-impact polystyrenes, and MBS resins. While these resins show a high impact resistance due to the butadiene component contained in the resin as a rubber component, they are deficient in thermal resistance and water resistance due to the unsaturated bond contained in the molecule and are particularly unsuitable for use at elevated temperatures or outdoors. On the other hand, incorporation of an ethylene-vinyl acetate copolymer or of an acrylic rubber has been proposed as a means to improve the impact resistance of a thermoplastic resin. However, these rubber components do not always show proper dispersion in the resins, and, in addition, result in unsatisfactory moisture resistance and alkali resistance. The olefin-acrylic ester copolymer for use in this invention has excellent resistances against water and hydrolysis owing to the introduced olefin units.

Another object of this invention is to improve surface characteristics of a nonpolar thermoplastic resin such as a hydrocarbon-based resin by proper incorporation and dispersion of a polar group such as an ester group in said resin. Being a hydrocarbon, a nonpolar resin such as polyethylene or polypropylene is inferior in such characteristic properties as adhesion and printability. These characteristic properties can be improved by introduction of a polar group. Further, a copolymer of an acrylic ester having an ester group of a large number of carbon atoms with an olefin possesses adhesiveness and can give tackiness to a resin. The effect of introduction of a polar group into the copolymer is further enhanced when the olefin-acrylic ester copolymerization is conducted in the presence of a third monomer having a reactive functional group, such as acrylic acid, acrolein, acryloyl halide, or acrylamide.

A further object of this invention is to improve low temperature characteristics of a thermoplastic resin. For instance, incorporation of an olefin-acrylic ester copolymer having a low second-order transition point is effective in lowering the brittleness temperature of the resin.

In accordance with this invention, there is provided an olefin-acrylic ester copolymer-thermoplastic resin composition comprising one part by weight of an olefin-acrylic ester copolymer and 0.01 to 100 parts by weight of a thermoplastic resin having a modulus of elasticity of $10^3$ to $10^5$ kg/cm$^2$ at room temperature and selected from the group consisting of crystalline thermoplastic resins and non-crystalline thermoplastic resins having a second-order transition point of 10° C. or higher.

The olefin-acrylic ester copolymer in this invention covers a broad range of copolymers comprising an olefin and an acrylic ester as major components; also included are said copolymers modified by further copolymerizing therewith at least one other copolymerizable monomer. Of these copolymers, preferred are those containing 5 to 60 mole-%, particularly 30 to 50 mole-%, of an olefin, and 40 to 95 mole-%, particularly 50 to 70 mole-%, of an acrylic ester. A particularly important copolymer in this invention is an alternating copolymer. In the case of a two-component copolymer, the alternating copolymer is composed of 50 mole-% of an olefin and 50 mole-% of an acrylic ester which are interlinked alternatingly to each other. In the case of a multi-component alternating copolymer containing a third monomer, the behavior of the third monomer — whether the third monomer behaves in the same manner as an olefin or as an acrylic ester in linking to the major monomers — is determined by the type of monomer itself as shown in British Patent No. 1,187,105 where the classification of monomers from such a standpoint has been given.

The olefin for use in the olefin-acrylic ester copolymer in this invention may be any olefinic compound copolymerizable with the acrylic ester, but olefinic hydrocarbon or halohydrocarbon compounds having 3 to 20 carbon atoms are preferable and the most preferred are aliphatic olefinic hydrocarbon compounds having 3 to 20 carbon atoms and halogen-substituted derivatives thereof. Among these preferable olefins, isobutylene and propylene are especially important and are used effectively in producing excellent copolymers. Among others, olefins having terminal unsaturated bonds, particularly isoolefins, are effective, and, if necessary, internal olefins copolymerizable with acrylic ester may be used. Examples of the above-noted olefins incude isobutylene, propylene, butene-1, 2-methylbutene-1, 2-methylpentene-1, hexene-1, butene-2, 4-methylpentene-1, β-methallyl chloride, 2-methyl-4-chloropentene-1, 2-methyl-4-phenylbutene-1 and octadecene-1. These olefinic compounds are included in the group (A) monomers mentioned below.

The acrylic ester compound to be copolymerized with the olefin may be any acrylic ester. There is no restriction with respect to the alcohol moiety of the ester, but hydrocarbon radicals having 1 to 20 carbon atoms or halogen-substituted derivative thereof are preferred as the alcohol moiety, examples being such radicals as alkyl, aryl, aralkyl, alkylaryl, cycloalkyl, alkenyl, aralkenyl, alkenylaryl, cycloalkenyl, and halogen-substituted derivatives thereof.

Examples of individual acrylic esters are methyl acrylate, ethyl acrylate, propyl acrylate, n-butyl acrylate, tert-butyl acrylate, n-amyl acrylate, n-hexyl acrylate, 2-ethylhexyl acrylate, octadecyl acrylate, tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylae, citronellyl acrylate, geranyl acrylate, 5'-norbornen-2'-ylmethyl acrylate, and β-chloroallyl acrylate.

The copolymers in this invention are generally of a high molecular weight, the intrinsic viscosity being, for example, 0.1 to 10 dl/g as measured by viscometry at 30° C. in benzene.

The copolymers for use in this invention are those of olefins and acrylic acid esters as major components, and may be further improved in polymer characteristics by incorporating with ethylenically unsaturated compounds to form multi-component copolymers. For such ethylenically unsaturated compounds, may be used various monomers, of which particularly preferred are the group (A) monomers and the group (B) monomers that are effective for alternating copolymerization. Suitable compounds are the monomers described in, for example British Patent 1,187,105. Examples of preferable monomers include the group (A) monomers represented by α-olefins, internal olefins, haloolefins, styrene homologs, diene compounds, unsaturated esters of carboxylic acids and unsaturated ethers, and the group (B) monomers represented by acrylonitrile, acryloyl halides, acrylic acid, and acrylamides.

The copolymer for use in this invention may be produced by any method for copolymerizing an olefin and an acrylic ester. In obtaining particularly high molecular copolymers, favorable results may be secured by addition of a Lewis acid, such as a metal halide, capable of forming a complex with the carboxy radical in the acrylic ester or acryloyl halide, to suppress the degenerative chain-transfer reaction due to the olefin. For such Lewis acids, may be used any compound capable of forming a complex with the lone electron pairs of the carbonyl group. Effective Lewis acids are, for example, halides of metals of Groups IIb, IIIb, IVb, Vb and VIII of the Periodic Table, particularly halogen compounds of aluminum, boron, zinc, and tin. Examples of such compounds are aluminum chloride, alkylaluminum halides, boron trichloride, boron trifluoride, alkylboron halides, zinc chloride, tin tetrachloride, and alkyltin halides. Such complexed copolymerization is initiated and accelerated by a radical polymerization catalyst, oxygen, organometallic compounds, light, and ionizing radiation.

A particularly important reaction is the copolymerization which results in an alternating copolymer. A system with a compound of aluminum or boron as catalyst is preferred in order to obtain efficiently the alternating copolymer. Concerning such a polymerization method, detailed decription has been given in specifications for British Patent Nos. 1,187,105; and 1,280,030. The above-said system forms a complex with the carbonyl group in the acrylic acid ester, and, at the same time, an organoaluminum halide or organoboron halide in the system acts also as an initiator, thus effectively resulting in an alternating copolymer. A system particularly preferred is that in which an organoaluminum halide, an organoboron halide, or an analogous component is used.

As stated, a preferable catalyst in this invention is a compound of the general formula $$MR_nX_{3-n}$$

wherein M is aluminum or boron, R is a hydrocarbon radical having 1 to 20 carbon atoms, X is a halogen, and n is any number greater than 0 and less than 3, preferably 1.5 or 2. Among these compounds, preferable and effective ones are alkylaluminum dihalides, alkylaluminum sesquihalides, dialkylaluminum halides, alkylboron dihalides, and dialkylboron halides; alkylaluminum sesquihalides and alkylboron dihalides are particularly effective, representatives thereof being ethylaluminum sesquichloride and ethylboron dichloride.

The thermoplastic resin for use in this invention has a modulus of elasticity of $10^3$ to $10^5$ kg/cm$^2$ at room temperature and is selected from crystalline thermoplastic resins or noncrystalline thermoplastic resins having a second-order transition point of 10° C. or higher. The molecular weight of the thermoplastic resin is preferably from 1,000 to 1,000,000, especialy 5,000 to 100,000. The crystalline thermoplastic resins include all polymers composed of regularly repeated units, typical examples being stereoregular hydrocarbon polymers, polyamides and polyesters. The non-crystalline thermoplastic resins having a second-order transition point of 10° C. or higher are polymers of common vinyl compounds, common condensation-type resins, such as, for example, polyphenylene oxide and polysulfone, particularly heat-resistant resins and polyacetal resins. Among the resins listed above, particularly important thermoplastic resins are homo- and co-polymers of ethylenically unsaturated compounds, including, for example, useful polymers of ethylenically unsaturated compounds having 2 to 20 carbon atoms. Examples of individual polymers are homo- and co-polymers of ethylene, propylene, butene-1, 4-methylpentene-1, styrene, vinyl-toluene, α-methylstyrene, monochlorostyrene, vinyl chloride, vinylidene chloride, acrylonitrile, methacrylonitrile, vinyl acetate, vinyl propionate, and methacrylic esters. Further, those heat resistant resins which require an impact resistance improving agent, particularly so-called engineering resins such as nylon and polysulfone are also important members of the subject resins. Examples of such thermoplastic resins include polypropylene, polyethylene, polystyrene, poly-4-methylpentene-1, polyvinyl chloride, polyacrylonitrile, polymethacrylonitrile, acrylonitrile-styrene copolymes, polyvinyl acetate, polymethyl methacrylate, 6-nylon, 66-nylon, 12-nylon, polycarbonate, polysulfone, polyesters, unsaturated polyesters, and polyacetals.

The composition of this invention is obtained by blending 1 part by weight of an olefin-acrylic ester copolymer and 0.01 to 100 parts by weight of the said thermoplastic resin. Characteristic properties of the thermoplastic resin can be properly adjusted especially when 1 to 100, preferably 5 to 20, parts by weight of the thermoplastic resin are used for 1 part by weight of the olefin-acrylic ester copolymer. Such compositions may be produced by employing any suitable method. The blending may be easily carried out by means of common mixing equipments such as mixing mill, Banbury mixer, extruder, and injection molding machine. Alternatively, a method may be used, whereby solutions prepared separately by dissolving each component in a respective solvent are mixed and then freed of the solvents. The composition of this invention may be admixed with other additives such as, for example, ultraviolet absorbers, stabilizers against heat and oxidation, pigments, fillers, reinforcing agents, anti-slip agents, antistatic agents, colorants, water repellents, foaming agents, and crosslinking agents.

The invention is illustrated below in detail with reference to Examples, but the scope of the invention is not limited to the Examples. In the Examples, measurements were conducted according to ASTM D 256-56 for impact strength, ASTM D 638-58T for tensile strength, ASTM C 1525-58T for Vicat softening point, and ASTM D 746-57T for brittleness temperature.

EXAMPLE 1

Eighty parts of weight of a commercial polypropylene (Sumitomo Noblen S-501, produced by Sumitomo Chemical Co.) and 20 parts by weight of an isobutylene-n-butyl acrylate copolymer (51.4 mole-% of isobutylene and 48.6 mole-% of n-butyl acrylate; intrinsic viscosity 1.23 dl/g, as measured in benzene at 30° C.) were milled on a 8 in.-roll mill at a surface temperature of 220° C. for 10 minutes. The resulting composition had an improved Charpy impact strength of 14.0 kg-cm/cm$^2$, compared with the impact strength of 4.2 kg-cm/cm$^2$ for polypropylene alone.

EXAMPLE 2

Ninety parts by weight of the same polypropylene as in Example 1 and 10 parts by weight of an isobutylene-2-ethylhexyl acrylate polymer (47.8 mole-% of isobutylene and 52.2 mole-% of 2-ethylhexyl acrylate; intrinisic viscosity 1.15 dl/g, as measured in benzene at 30° C.) were milled in a manner similar to that in Example 1, to obtain a composition having an impact strength of 11.9 kg-cm/cm$^2$.

EXAMPLE 3

Twenty parts by weight of the same isobutylene-2-ethylhexyl acrylate copolymer as that used in Example 2 and 80 parts by weight of polypropylene were milled in a Brabender plastograph. The resulting composition showed an improved brittleness temperature of −23.7° C., as compared with 2° C, the brittleness temperature of the polypropylene.

Such improvements in impact resistance and low temperature characteristics have hitherto been effected by the addition of various rubbers such as polysiobutylene, ethylene-propylene copolymer, and polybutadiene. The resulting composition, however, has a defect of clouding at a fold.

The composition of the present Example was pressed at 210° C. to prepare a sheet, 1 mm in thickness, to examine the phenomenon of clouding at a fold. The phenomenon was found to have been markedly improved as compared with the case in which the above-noted rubbers were used.

EXAMPLE 4

Ninety parts by weight of a polystyrene (Esbrite GP-8, produced by Nihon Polystyrene Co.) and 10 parts by weight of an isobutylene-ethyl acrylate copolymer (50.2 mole-% of isobutylene and 49.8 mole-% of ethyl acrylate) were milled on a mixing mill at a surface temperature of 170° to 180° C. On inspection with an electron microscope, the composition was found to be a dispersion of particles, 0.2 to 0.5 μ in diameter. On tensile test, the composition showed a tensile strength of 314 kg/cm$^2$ and an elongation of 12.5%, whereas the polystyrene ruptured without showing any substantial elongation.

EXAMPLE 5

Ninety parts by weight of a polymethyl methacrylate (Sumipex MG-1, produced by Sumitomo Chemical Co.) and 10 parts by weight of a propylene-ethyl acrylate copolymer (48.8 mole-% of propylene and 51.2 mole-% of ethyl acrylate) were milled in a Brabender plastograph at around 180° C. From observation made on the resulting composition by means of an electron microscope it was found that the dispersed particles were 0.2 to 0.3 μ in size and in a good dispersion. On tensile test, the composition showed a tensile strength at rupture of 407 kg/cm$^2$.

EXAMPLE 6

Eighty-five parts by weight of a polyvinyl chloride (Sumilit SX-11; produced by Sumitomo Chemical Co.), 5 parts by weight of a stabilizer for polyvinyl chloride (KS-41, produced by kyōdō Yakuhin Co.) and 10 parts by weight of an isobutylene-ether acrylate copolymer (50.4 mole-% of isobutylene and 49.6 mole-% of ethyl acrylate; intrinsic viscosity 2.23 dl/g, as measured in benzene at 30° C.) were milled in a Banbury mixer at 180° C. for 10 minutes. The resulting composition had an improved impact strength of 21.9 kg-cm/cm$^2$ as compared with the impact strength, 9.9 kg-cm/cm$^2$, of the polyvinyl chloride.

EXAMPLE 7

Ninety-five parts by weight of a polyacetal resin (Duracon M 90-02, produced by Polyplastic Co.; intrinsic viscosity 1.46 dl/g, as measured in p-chlorophenol at 60° C.) and 5 parts by weight of an isobutylene-n-butyl acrylate copolymer (49.2 mole-% of isobutylene and 50.8 mole-% of n-butyl acrylate) were mixed in a Banbury mixer at 175° C. for 10 minutes, and then granulated. The resulting composition had a breaking strength of 457 kg/cm$^2$, a Vicat softening point of 159° C., a Rockwell hardness of R 118 M 92, and an impact strength of 12.6 kg-cm/cm$^2$. The impact strength was improved as compared with the polyacetal resin having an impact strength of 8.4 kg-cm/cm$^2$, while no deterioration in mechanical properties was found.

What is claimed is:

1. An olefin-acrylic ester copolymer-thermoplastic resin composition comprising
   one part by weight of an aliphatic olefin-acrylic ester copolymer, said aliphatic olefin having at least three carbon atoms and
   0.01 to 100 parts by weight of at least one thermoplastic resin having a modulus of elasticity of $10^3$ to $10^5$ kg/cm$^2$ at room temperature, and selected from the group consisting of crystalline vinyl resins and non-crystalline vinyl resins having a second order transition point of at least 10° C, said vinyl resins being homopolymers or copolymers of ethylene, propylene, butene-1, 4-methylpentene-1, styrene, vinyl toluene, α-methylstyrene, monochlorostyrene, vinyl chloride, vinylidene chloride, acrylonitrile, methacrylonitrile, vinyl acetate, vinyl propionate and methacrylic esters.

2. An olefin-acrylic ester copolymer-thermoplastic resin composition comprising
   one part by weight of an aliphatic olefin-acrylic ester copolymer, said aliphatic olefin having at least three carbon atoms and
   0.001 to 100 parts by weight of at least one thermoplastic resin having a modulus of elasticity of $10^3$ to $10^5$ kg/cm$^2$ at room temperature, and selected from the group consisting of crystalline vinyl resins and non-crystalline vinyl resins having a second order transition point of at least 10° C, said vinyl resins being polypropylene, polyethylene, polystyrene, poly-4-methylpentene-1, polyvinyl chloride, polyacrylonitrile, polymethacrylonitrile, acrylonitrile-styrene copolymers, polyvinyl acetate, and polymethyl methacrylate.

3. A composition according to claim 1, wherein amount of the thermoplastic resin is 5 to 20 parts by weight.

4. A composition according to claim 1, wherein the vinyl resin is a crystalline thermoplastic resin.

5. A composition according to claim 1, wherein the vinyl resin is a non-crystalline thermoplastic resin having a second-order transition point of 10° C. or higher.

6. A composition according to claim 1, wherein the olefin component of the olefin-acrylic ester copolymer is an olefinic hydrocarbon compound having 3 to 20 carbon atoms.

7. A composition according to claim 6, wherein the olefin component is isobutylene, propylene, butene-1, 2-methylbutene-1, 2-methylpentene-1, hexene-1, butene-2, 4-methylpentene-1, 2-methyl-4-phenylbutene-1 or octadecene-1.

8. A composition according to claim 1, wherein the acrylic ester component of the olefin-acrylic ester copolymer has as the alcohol moiety a hyrocarbon radical having 1 to 20 carbon atoms or a halogen-substituted derivative thereof.

9. A composition according to claim 8, wherein the alcohol moiety of the ester is alkyl, aryl, aralkyl, alkylaryl, cycloalkyl, alkenyl, aralkenyl, alkenylaryl, cycloalkenyl or a halogen-substituted derivative thereof.

10. A composition according to claim 1, wherein the acrylic ester component is methyl acrylate, ethyl acrylate, propyl acrylate, n-butyl acrylate, tert-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylate, citronellyl acrylate, geranyl acrylate, 5'-norbornen-2'-ylmethyl acrylate, or β-chloroallyl acrylate.

11. A composition according to claim 1, wherein the olefin-acrylic ester copolymer is a two-component copolymer.

12. A composition according to claim 11, wherein olefin-acrylic ester two-component copolymer is an alternating copolymer.

13. A composition according to claim 12, wherein the olefin component is isobutylene or propylene.

14. A composition according to claim 1, wherein the olefin-acrylic ester copolymer is a multi-component copolymer.

15. A composition according to claim 14, wherein the third monomer is at least one member of the group (A) monomers and selected from the group consisting of internal olefins, haloolefins, styrene homologs, diene compounds, and unsaturated esters of carboxylic acids.

16. A composition according to claim 14, wherein the third monomer is at least one member of the group (B) monomers and selected from the group consisting of arylonitrile, acryloyl halides, acrylic acid, and acrylamides.

17. A composition according to claim 14, wherein the multi-component copolymer is an alternating copolymer.

18. A composition according to claim 1, wherein the olefin-acrylic ester copolymer contains 5 to 60 mole percent of an olefin and 40 to 95 mole percent of an acrylic ester.

19. A composition according to claim 1, wherein the olefin-acrylic ester copolymer contains 30 to 50 mole percent of an olefin and 50 to 70 mole percent of an acrylic ester.

20. A composition according to claim 1, wherein the olefin-acrylic ester copolymer has an intrinsic viscosity of 0.1 to 10 dl/g as measured in benzene in 30° C.

21. A composition according to claim 1, wherein the copolymer is a copolymer of isobutylene or propylene with ethyl acrylate, n-butyl acrylate, or 2-ethylhexyl acrylate.

* * * * *